United States Patent
Ball et al.

(10) Patent No.: US 8,041,937 B2
(45) Date of Patent: Oct. 18, 2011

(54) MULTIPLE GUEST O.S. BOOT FOR SERVER COMPONENT SETUP

(75) Inventors: Charles Douglas Ball, Chapel Hill, NC (US); Liang Chen, Raleigh, NC (US); Jonathan Gaither Knox, Morrisville, NC (US); Vishwani Sodhi, Durham, NC (US); Bradley Park Strazisar, Cary, NC (US); Arnold S. Weksler, Raleigh, NC (US); Yi Zhou, Raleigh, NC (US)

(73) Assignee: Lenovo (Singapore) Pte., Ltd., Singapore (SG)

( * ) Notice: Subject to any disclaimer, the term of this patent is extended or adjusted under 35 U.S.C. 154(b) by 514 days.

(21) Appl. No.: 12/244,293

(22) Filed: Oct. 2, 2008

(65) Prior Publication Data

US 2010/0088500 A1    Apr. 8, 2010

(51) Int. Cl.
*G06F 9/00* (2006.01)

(52) U.S. Cl. .................................. 713/2; 713/1

(58) Field of Classification Search .................. 713/1, 2
See application file for complete search history.

(56) References Cited

U.S. PATENT DOCUMENTS

| | | | |
|---|---|---|---|
| 7,421,688 B1* | 9/2008 | Righi et al. | 717/172 |
| 2005/0251799 A1* | 11/2005 | Wang | 717/168 |
| 2006/0130039 A1* | 6/2006 | Yuuki | 717/168 |
| 2007/0028228 A1* | 2/2007 | Battista et al. | 717/168 |
| 2007/0240149 A1* | 10/2007 | Cromer et al. | 717/171 |
| 2008/0005733 A1* | 1/2008 | Ramachandran et al. | 717/168 |
| 2008/0189697 A1* | 8/2008 | Kachroo et al. | 717/171 |
| 2009/0198988 A1* | 8/2009 | Bai et al. | 713/2 |

* cited by examiner

*Primary Examiner* — Thomas Lee
*Assistant Examiner* — Phil Nguyen
(74) *Attorney, Agent, or Firm* — John L. Rogitz

(57) ABSTRACT

A hypervisor boots all guest operating systems needed to setup/update server components as detected by an update utility. The update utility, after detecting server components, is booted into each guest O.S. so that the components are updated in parallel without having to sequentially boot the utility into a guest O.S., update its component, then shut down and re-boot into another guest O.S.

12 Claims, 2 Drawing Sheets

(TYPE 2 HYPERVISOR)

(TYPE 2 HYPERVISOR)

MULTIPLE GUEST O.S. BOOT FOR SERVER COMPONENT SETUP

FIELD OF THE INVENTION

The present invention relates generally to setting up and/or updating server components.

BACKGROUND OF THE INVENTION

Computer servers typically have multiple firmware/hardware components that require setting up and potentially periodically updating. For example, a server may include a redundant array independent disk (RAID) controller, a server basic input output system (BIOS), video cards, network interfaces, etc., and some or all of these components require initial setup and often require periodic updating.

To setup and update server components, setup utilities (which are software programs) are often provided which are tailored to, e.g., update all the server components in one update process. The utility may be provided on a disk, and the server can invoke the utility by launching the utility into the utility's native operating system. The utility then discovers which components requiring updating are possessed by the server, and then sequentially updates each component.

As understood herein, it is frequently the case that each server component may have a native operating system that is different from the native operating systems of at least some of the other components. This means that the utility must relaunch itself into the native operating system of a first component, execute the update, then shut down and reboot into the native operating system of the next component, and so on until all components have been updated. This cyclic booting, updating, shutting down, and rebooting undesirably consumes time.

SUMMARY OF THE INVENTION

A tangible computer readable storage medium bears a hypervisor that is executable by a processor to boot all guest operating systems (GOS) needed to configure server components detected by an update utility. The update utility is executed in each GOS so that the components are updated in parallel without having to sequentially launch the utility into a GOS, update its component, then shut down and re-boot into another GOS.

Without limitation the hypervisor can be a type 1 or type 2 hypervisor. In some embodiments the hypervisor can boot a setup operating system (SOS) associated with the utility prior to booting the GOS. In this case the utility executes on the SOS to detect server components. The utility also executes in each GOS to configure the respective component.

In another aspect, a method includes detecting first and second server components associated with a server. The first component is associated with a first guest operating system (GOS) and the second component is associated with a second GOS. The method also includes booting the first and second GOS to execute in the server simultaneously with each other, and then configuring the components in parallel using the first and second GOS.

In another aspect, a computer includes a processor and a computer readable storage medium accessible to the processor to boot a setup operating system (SOS), execute a utility in the SOS to discover at least first and second components associated with the computer, and then boot a first guest operating system (GOS) associated with the first component. A second guest operating system (GOS) associated with the second component is also booted such that both GOS execute on the computer simultaneously. The utility is executed in the first GOS to configure the first component, and it also executed in the second GOS to configure the second component.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

While the below discussion refers to both "type 1" and "type 2" hypervisors, present principles apply to hypervisor systems in general. "Configure" as used herein broadly refers to initially setting up a server component as well as subsequently updating the component with updated software.

Figure 1:
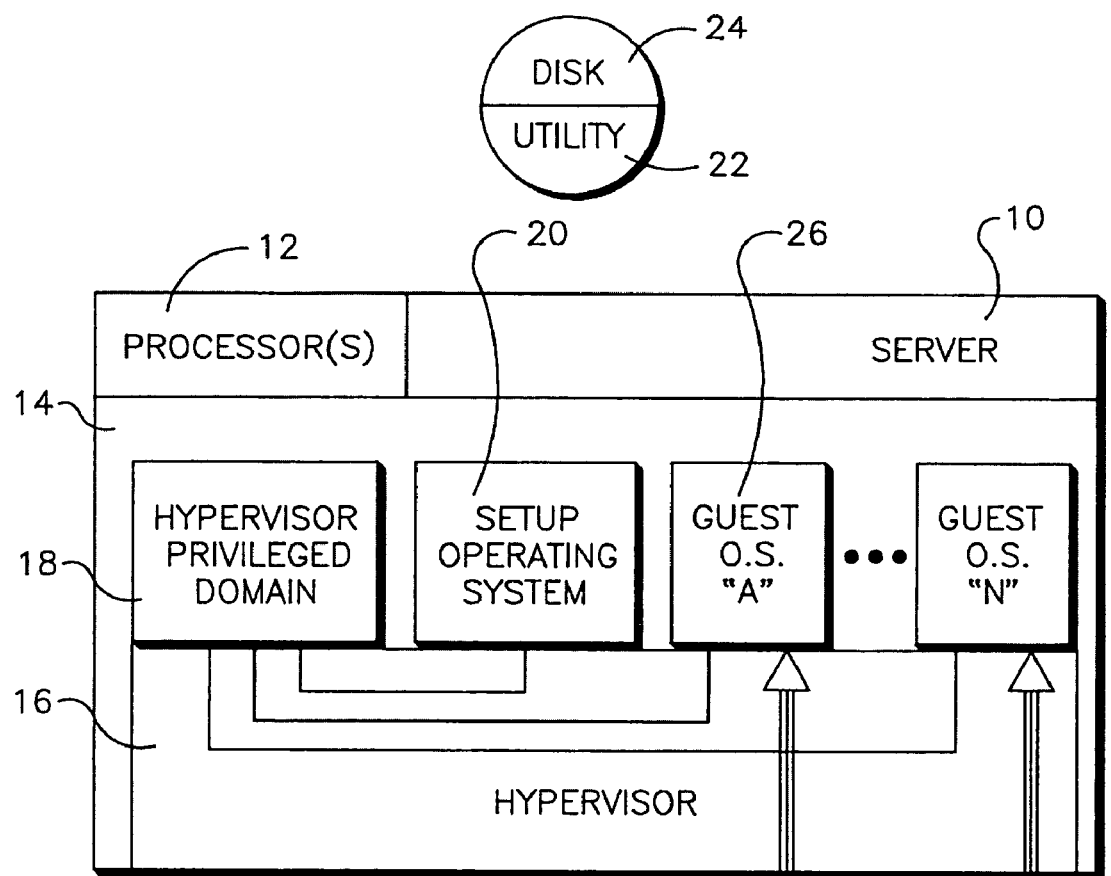
FIG. 1 is a block diagram of an example system showing both hardware and software components in a "Type 1" hypervisor environment.

Referring initially to FIG. 1, a computer such as a server 10 includes one or more processors 12 accessing one or more tangible computer readable storage media 14 such as but not limited to disk-based or solid state storage. In the embodiment shown, the storage bears a hypervisor 16 that can include a privileged domain 18 which may be referred to as "D0" and which is typically configured for interfacing with a user.

The media 14 may also bear a setup operating system (SOS) 20. The setup operating system is the native operating system of a configuration utility 22, which may be supplied on a configuration disk 24 such as an optical disk that can be engaged with the server 10 for access by the processor 12.

From time to time in accordance with disclosure below the media 14 may also bear at least two guest operating systems (GOS) 26. Each GOS 26 is associated with a respective component 28. While some components 28 may share the same GOS 26, it is to be understood that owing to the mix of components 28, at least two GOS 26 that are different from each other typically are required by the server 10. It is to be understood that two or more GOS 26 may execute on the server 10 simultaneously with other under the control of the hypervisor 16.

Without limitation, the GOS 26 and SOS 20 may be Linux operating systems. Other examples of specific non-limiting types of GOS that may be used include disk operating system (DOS). In any case, a component 28 may be, without limitation, a BIOS, a RAID controller (which may be associated with a Linux GOS), a network interface (which may be associated with a DOS GOS), a video card, etc.

Figure 2:
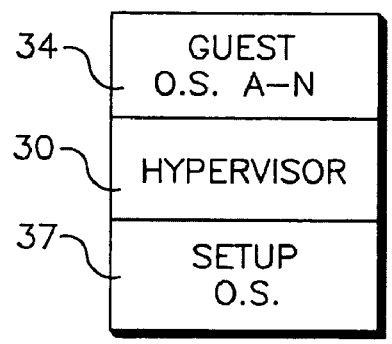
FIG. 2 is a block diagram of a "type 2" hypervisor system.

While FIG. 1 shows an example embodiment of a so-called "type 1" hypervisor, FIG. 2 shows an operating system stack associated with a "type 2" hypervisor 30 in which the hypervisor 30 executes on a SOS 32 which is substantially identical in configuration and function to the SOS 20 shown in FIG. 1. Plural GOS 34 (only one GOS shown for clarity) which are substantially identical in configuration and function to the GOS 26 shown in FIG. 1 execute on the hypervisor 30. The logic of FIG. 3 may be employed by either type of hypervisor.

Figure 3:
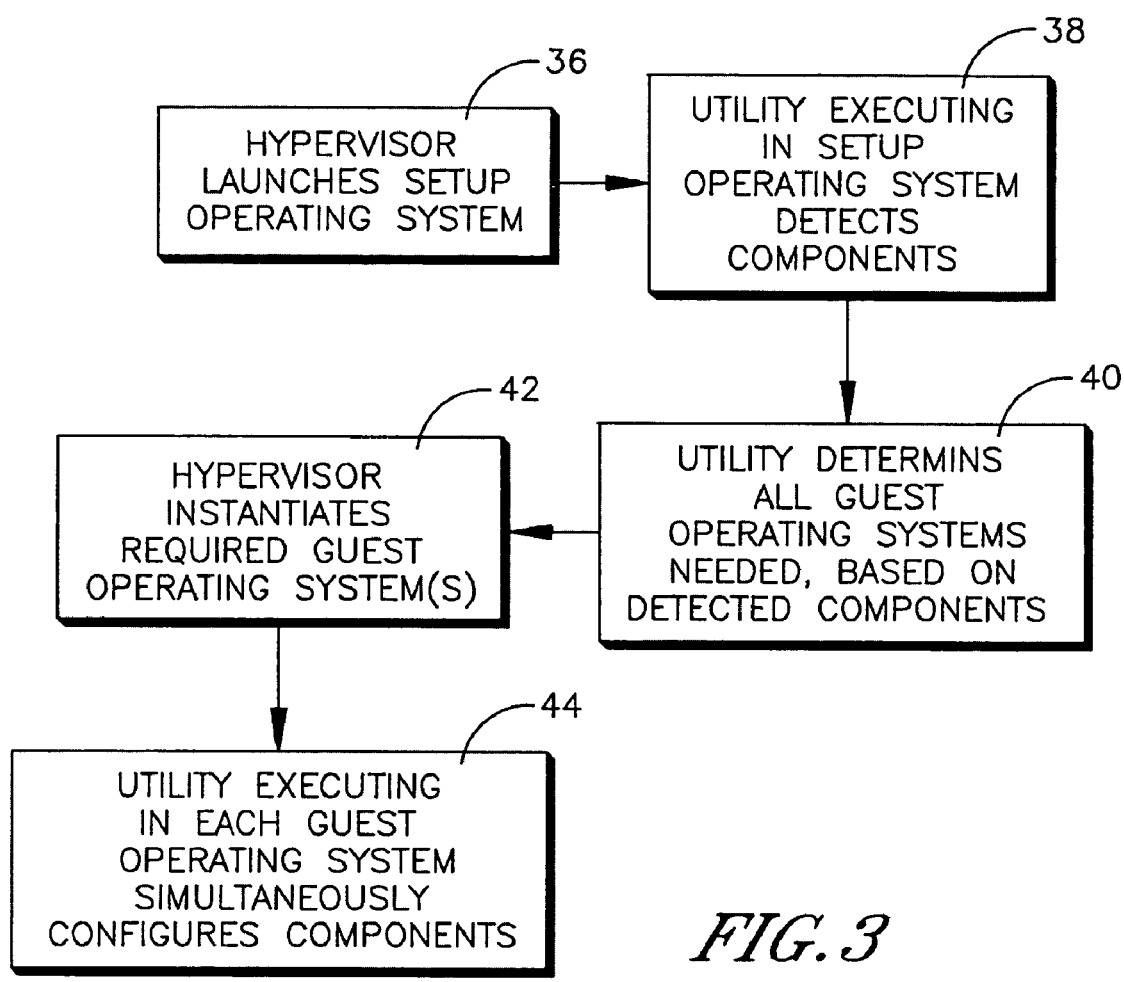
FIG. 3 is a flow chart of example logic for implementing present principles.

Now referring to FIG. 3, once the utility has been loaded onto the server (by, e.g., engaging the disk 24 with a disk drive of the server), at block 36 the hypervisor boots the SOS, i.e., the native operating system of the utility. The utility executes, in the SOS at block 38 to detect components requiring configuration. Based on the detected components, it is known which GOS require booting, and in the example non-limiting logic shown this determination may be made by the utility at block 40.

Moving to block 42, the hypervisor boots the GOS identified in block 40 such that at least first and second GOS that are different from each other execute simultaneously with each other on the server 10. The utility is then executed in each GOS at block 44 to configure the components in parallel with each other by, e.g., updating each component with updated computer software.

While the particular MULTIPLE GUEST O.S. BOOT FOR SERVER COMPONENT SETUP is herein shown and described in detail, it is to be understood that the subject matter which is encompassed by the present invention is limited only by the claims.

What is claimed is:

1. A non-transitory computer readable storage medium bearing a hypervisor executable by a processor to:
    boot all guest operating systems (GOS) needed to configure server components detected by an update utility;
    execute the update utility in each GOS so that the components are updated in parallel without having to sequentially launch the utility into a GOS, update its component, then shut down and re-launch into another GOS
    wherein the hypervisor boots a setup operating system (SOS) associated with the utility prior to booting the GOS;
    wherein the utility executes on the SOS to detect server components; and
    wherein the utility executes in each GOS to configure the respective component.

2. The non-transitory computer readable storage medium of claim 1, wherein the hypervisor is a type 1 hypervisor.

3. The non-transitory computer readable storage medium of claim 1, wherein the hypervisor is a type 2 hypervisor.

4. Method comprising:
    booting a setup operating system;
    detecting first and second server components associated with a server, the first component being associated with a first guest operating system (GOS) and the second component being associated with a second GOS;
    booting the first and second GOS to execute in the server simultaneously with each other;
    configuring the components in parallel using the first and second GOS;
    wherein the detecting and configuring acts are executed by a utility operating under the setup operating system; and
    wherein the utility executes in each GOS to configure the respective component.

5. The method of claim 4, wherein the booting act is executed by a hypervisor.

6. The method of claim 5, wherein the hypervisor is a type 1 hypervisor.

7. The method of claim 5, wherein the hypervisor is a type 2 hypervisor.

8. A computer, comprising:
    at least one processor;
    at least one computer readable storage medium accessible to the processor to:
        boot a setup operating system (SOS);
        execute a utility in the SOS to discover at least first and second components associated with the computer;
        boot a first guest operating system (GOS) associated with the first component;
        boot a second guest operating system (GOS) associated with the second component such that both GOS execute on the computer simultaneously;
        execute the utility in the first GOS to configure the first component; and
        execute the utility in the second GOS to configure the second component.

9. The computer of claim 8, wherein the processor executes a hypervisor.

10. The computer of claim 9, wherein the hypervisor is a type 1 hypervisor.

11. The computer of claim 9, wherein the hypervisor is a type 2 hypervisor.

12. The computer of claim 9, wherein the hypervisor boots the SOS prior to booting the GOS.

* * * * *